(12) United States Patent
Riedel et al.

(10) Patent No.: US 8,553,706 B2
(45) Date of Patent: Oct. 8, 2013

(54) FLEXIBLE SCHEDULING OF RESOURCES IN A NOISY ENVIRONMENT

(75) Inventors: Neal Riedel, Carlsbad, CA (US);
Yiorgos M. Peponides, Encinitas, CA (US); James E. Petranovich, La Jolla, CA (US); Lawrence W. Yonge, Ocala, FL (US); Srinivas Katar, Gainesville, FL (US); Deepak Ayyagari, Vancouver, WA (US); Sherman L. Gavette, Camas, WA (US); Wai Chung Tony Chan, Vancouver, WA (US)

(73) Assignee: CopperGate Communications Ltd., Tel Aviv (IL)

( * ) Notice: Subject to any disclaimer, the term of this patent is extended or adjusted under 35 U.S.C. 154(b) by 504 days.

(21) Appl. No.: 11/492,506

(22) Filed: Jul. 24, 2006

(65) Prior Publication Data

US 2007/0058732 A1  Mar. 15, 2007

Related U.S. Application Data

(60) Provisional application No. 60/702,717, filed on Jul. 27, 2005, provisional application No. 60/705,720, filed on Aug. 2, 2005, provisional application No. 60/703,236, filed on Jul. 27, 2005, provisional application No. 60/703,317, filed on Jul. 27, 2005.

(51) Int. Cl.
  *H04L 12/28* (2006.01)
(52) U.S. Cl.
  USPC .......................................... 370/401; 370/445
(58) Field of Classification Search
  None
  See application file for complete search history.

(56) References Cited

U.S. PATENT DOCUMENTS

| 5,249,184 A | 9/1993 | Woest et al. |
| 5,297,275 A | 3/1994 | Thayer et al. |

(Continued)

FOREIGN PATENT DOCUMENTS

| EP | 1065818 A1 | 1/2001 |
| JP | HE08-265241 | 10/1996 |

(Continued)

OTHER PUBLICATIONS

Afkhamie, Kaywan H. et al., "An Overview of the updated HomePlug AV Standard", 2005 International Symposium on Power Line Communications and its Applications, pp. 400-404 (Apr. 8, 2005).

(Continued)

*Primary Examiner* — Kevin C Harper
*Assistant Examiner* — Rhonda Murphy
(74) *Attorney, Agent, or Firm* — Daniel J. Swirsky; AlphaPatent Associates Ltd.

(57) ABSTRACT

There is provided a powerline network that includes a number of stations including a central coordinator for coordinating transmissions of each of the stations. The central coordinator is configurable to transmit a beacon at an interval based on a phase of a powerline cycle. The interval of the beacon can be substantially equal to two periods of the powerline cycle. The interval of the beacon includes a reserved region including a persistent allocation region and a non-persistent allocation region. The beacon also includes a broadcast message including a persistent schedule and a non-persistent schedule. The persistent schedule is valid for a current beacon period and a number of subsequent beacon periods as indicated by the beacon, while the non-persistent schedule is valid for a single beacon period. The persistent allocation region and the non-persistent allocation region are determined based on the persistent schedule and the non-persistent schedule, respectively.

7 Claims, 4 Drawing Sheets

(56) References Cited

U.S. PATENT DOCUMENTS

| | | | |
|---|---|---|---|
| 6,172,615 B1 | 1/2001 | Kogure | |
| 6,172,616 B1 | 1/2001 | Johnson et al. | |
| 6,278,357 B1 * | 8/2001 | Croushore et al. | 375/259 |
| 6,577,231 B2 | 6/2003 | Litwin, Jr. et al. | |
| 6,587,474 B1 | 7/2003 | Griessbach | |
| 6,834,091 B2 | 12/2004 | Litwin et al. | |
| 6,882,634 B2 | 4/2005 | Bagchi | |
| 6,888,844 B2 | 5/2005 | Mallory | |
| 6,952,399 B1 | 10/2005 | Bayerl et al. | |
| 6,985,072 B2 | 1/2006 | Omidi et al. | |
| 7,000,031 B2 | 2/2006 | Fischer et al. | |
| 7,038,584 B2 * | 5/2006 | Carter | 340/539.13 |
| 7,206,320 B2 * | 4/2007 | Iwamura | 370/448 |
| 7,218,901 B1 | 5/2007 | Mobley et al. | |
| 7,307,357 B2 | 12/2007 | Kopp | |
| 7,352,770 B1 | 4/2008 | Yonge et al. | |
| 7,359,398 B2 * | 4/2008 | Sugaya | 370/431 |
| 7,369,579 B2 | 5/2008 | Logvinov et al. | |
| 7,388,853 B2 | 6/2008 | Ptasinski et al. | |
| 7,423,992 B2 | 9/2008 | Iwamura | |
| 7,664,145 B2 | 2/2010 | Akamatsu et al. | |
| 8,028,097 B2 * | 9/2011 | Iwamura | 709/248 |
| 2003/0053493 A1 | 3/2003 | Mobley et al. | |
| 2003/0071721 A1 | 4/2003 | Manis et al. | |
| 2003/0107476 A1 | 6/2003 | Sahinoglu et al. | |
| 2003/0231715 A1 | 12/2003 | Shoemake et al. | |
| 2004/0122531 A1 * | 6/2004 | Atsuta et al. | 700/1 |
| 2004/0136396 A1 | 7/2004 | Yonge et al. | |
| 2004/0174851 A1 | 9/2004 | Zalitzky et al. | |
| 2004/0184427 A1 | 9/2004 | Lynch | |
| 2004/0208139 A1 | 10/2004 | Iwamura | |
| 2004/0264557 A1 | 12/2004 | Maruyama | |
| 2005/0276276 A1 | 12/2005 | Davis | |
| 2006/0098606 A1 * | 5/2006 | Pandey et al. | 370/338 |
| 2006/0164969 A1 * | 7/2006 | Malik et al. | 370/203 |
| 2006/0218269 A1 | 9/2006 | Iwamura | |
| 2006/0227729 A1 | 10/2006 | Budampati et al. | |
| 2006/0233203 A1 * | 10/2006 | Iwamura | 370/516 |
| 2007/0025266 A1 | 2/2007 | Riedel | |
| 2007/0025384 A1 | 2/2007 | Ayyagari | |
| 2007/0237070 A1 | 10/2007 | Geile et al. | |
| 2008/0095126 A1 * | 4/2008 | Mahany et al. | 370/338 |
| 2008/0201503 A1 | 8/2008 | McKim et al. | |
| 2009/0279638 A1 | 11/2009 | Kurobe et al. | |

FOREIGN PATENT DOCUMENTS

| | | |
|---|---|---|
| JP | 2000165304 | 6/2000 |
| JP | 2002-135177 | 5/2002 |
| JP | 2005-73240 | 3/2005 |
| JP | 2005079615 | 3/2005 |
| WO | WO 96/34329 | 10/1996 |
| WO | WO 01/18998 | 3/2001 |
| WO | WO 02/103943 | 12/2002 |
| WO | 2003100996 | 4/2003 |
| WO | WO 03/103222 | 12/2003 |
| WO | WO 2005/015841 | 2/2005 |
| WO | WO2005/024558 A2 | 3/2005 |
| WO | WO 2005/048047 | 5/2005 |

OTHER PUBLICATIONS

English abstract of JP 2000165304 generated online on May 22, 2013.

* cited by examiner

FLEXIBLE SCHEDULING OF RESOURCES IN A NOISY ENVIRONMENT

RELATED APPLICATIONS

This application claims priority from U.S. Provisional Application No. 60/702,717, filed on Jul. 27, 2005, which is hereby incorporated by reference in its entirety. The following U.S. patent applications are also incorporated by reference in their entireties and made part of the present application:

U.S. patent application Ser. No. 11/492,505, titled "BANDWIDTH MANAGEMENT IN A POWER LINE ENVIRONMENT,", filed concurrently with the present application;

U.S. patent application Ser. No. 11/492,487, titled "COMMUNICATING SCHEDULE AND NETWORK INFORMATION IN A POWERLINE NETWORK,", filed concurrently with the present application;

U.S. Provisional Application No. 60/705,720, titled "Communicating in a Network that includes a Medium having Varying Transmission Characteristics, filed Aug. 2, 2005;

U.S. patent application Ser. No. 11/339,293, titled "Time Synchronization in a Network," filed Jan. 24, 2006;

U.S. patent application Ser. No. 11/337,946, titled "Communicating in a Network that includes a Medium having Varying Transmission Characteristics," filed Jan. 23, 2006;

U.S. patent application Ser. No. 11/421,155, titled "Synchronizing Channel Sharing with Neighboring Networks," filed on May 31, 2006, assigned to Sharp Laboratories of America, Inc.;

U.S. Provisional Application No. 60/703,236, titled "Method for Sharing the Channel with Neighbor Networks," filed Jul. 27, 2005;

U.S. patent application Ser. No. 11/420,432, titled "Method for Providing Requested Quality of Service," filed on May 25, 2006, assigned to Sharp Laboratories of America, Inc.;

U.S. Provisional Application No. 60/703,317, titled "Method for Providing Requested Quality of Service," filed Jul. 27, 2005; and U.S. patent application Ser. No. 11/337,963, titled "Managing Contention-Free Time Allocations in a Network," filed Jan. 23, 2006.

BACKGROUND OF THE INVENTION

1. Field of the Invention

The present invention relates generally to communication over an Ethernet-Class network and, more specifically to communication over a power line network.

2. Background Art

The vision of the networked home has driven many a business plan, but product offerings to date have been too limited in capability or in market potential to achieve the dream. Home networking is different than networking in the workplace. The applications are different, the traffic patterns are different, and the media available to carry the data are different. Certainly home networking users will want to transfer files between their computers and share peripherals such as printers. They will want gateways to broadband access so they can share their Internet connection between multiple devices. Users will also want other services, such as voice-over-IP (VoIP), streaming media for entertainment, and support for multi-player networked games.

While some newer houses are wired with cables suitable for Ethernet, most are not. Thus, if choices for home network physical media are limited to phone wiring, wireless, and power line, there are a mixed bag of attributes.

There has been a proliferation of wireless networking and related components in recent years. However, wireless communication suffers from limited range and less than universal coverage, i.e. certain areas of the home cannot communicate with others. These issues are particularly prominent in certain types of construction that result in poor signal propagation, such as those using steel frame and brick walls. Solutions to these issues are expensive and complex, and require some technical acumen not available to the average homeowner.

Although telephone line networking may at first appear to be a solution, many households lack phone jacks at convenient locations to achieve the foreseeable benefits of home networking. For instance, some older houses may only have one phone jack located in the kitchen for use in the kitchen and other living areas (e.g. living room, family room, etc). Thus, it may be inconvenient or messy to provide network connections to remote devices. This picture is particularly unfavorable in less developed countries. Power plugs, on the other hand, are located in almost every room in the home, and some homes have multiple power outlets located on every wall of every room. The power line appears to be the most difficult medium of these three for communication, but it does have two appealing attributes. First, as with phone lines, no RF conversion hardware is needed and, thus, the cost can be low compared to wireless solutions. But more importantly, power outlets are almost everywhere someone might want to use a networked device at home.

The power line medium is a harsh environment for communication. For instance, the channel between any two outlets in a home has the transfer function of an extremely complicated transmission line network with many unterminated stubs and some having terminating loads of varying impedance. Such a network has an amplitude and phase response that varies widely with frequency. At some frequencies the transmitted signal may arrive at the receiver with relatively little loss, while at other frequencies it may be driven below the noise floor. Worse, the transfer function can change with time. This might happen because the homeowner has plugged a new device into the power line, or if some of the devices plugged into the network have time-varying impedance. As a result, the transfer function of the channel between outlet pairs may vary over a wide range. In some cases, a broad swath of bandwidth may be suitable for high quality transmission, while in other cases the channel may have a limited capacity to carry data.

With many power outlets available for plugging in a new networked device at any time, the issues involving the management and coordination of the networked devices bring about concerns regarding the overall throughput of the network, Quality of Service (QoS) for each connection, authentication, coordination, and sharing of the network resources. Accordingly, there is a need in the art for management and coordination schemes that can effectively and efficiently address such concerns.

SUMMARY OF THE INVENTION

The present invention is directed to method and system for flexible scheduling of resources in a noisy environment. More specifically, the invention provides a method and system for effectively managing and coordinating networked devices to achieve flexible scheduling of resources in a powerline network.

In one aspect, a powerline network includes a number of stations including a central coordinator for coordinating transmissions of each of the stations. The central coordinator is configurable to transmit a beacon at an interval based on a phase of a powerline cycle. The interval of the beacon can be substantially equal to two periods of the powerline cycle. The interval of the beacon includes a reserved region including a persistent allocation region and a non-persistent allocation region. The beacon also includes a broadcast message including a persistent schedule and a non-persistent schedule. The persistent schedule is valid for a current beacon period and a number of subsequent beacon periods as indicated by the beacon, while the non-persistent schedule is valid for a single beacon period. The persistent allocation region and the non-persistent allocation region are determined based on the persistent schedule and the non-persistent schedule, respectively. The beacon may further include a preview schedule, for example.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 1:
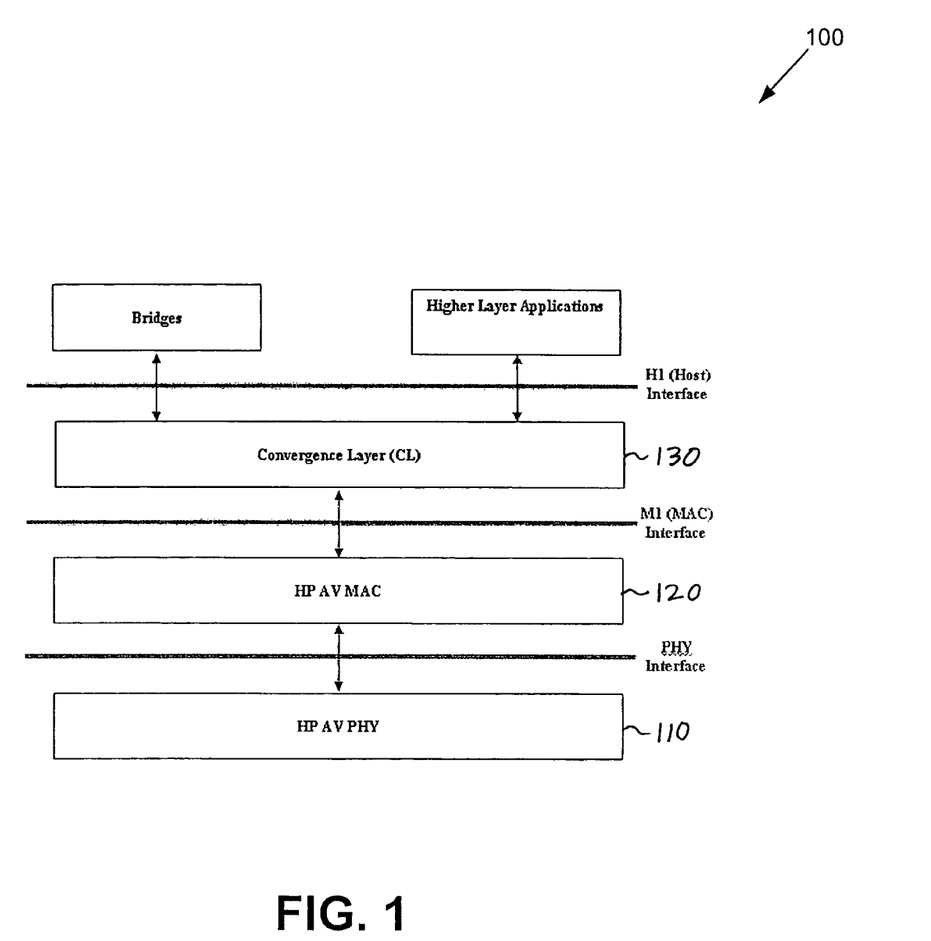
FIG. 1 illustrates an overview of a HPAV (HomePlug Audio Video) system, according to one embodiment of the present application.

FIG. 1 illustrates an overview of HPAV (HomePlug Audio Video) system 100, according to one embodiment of the present application. As shown, HPAV system 100 includes PHY (Physical) layer 110, MAC (Media Access Control) layer 120 and convergence layer 130. When HPAV system 100 is in transmit mode, PHY layer 110 performs error-control correction, mapping into OFDM (Orthogonal Frequency Division Multiplexing) symbols, and generation of time-domain waveforms; MAC layer 120 determines the correct position of transmission, formats data frames into fixed-length entities for transmission on the channel and ensures timely and error-free delivery through Automatic Repeat Request (ARQ); and convergence layer 130 performs bridging, classification of traffic into connections, and data delivery smoothing functions. Conversely, when HPAV system 100 is in receive mode, PHY layer 110, MAC layer 120 and convergence layer 130 perform the corresponding functions in the reverse.{XE "System block diagram"}

HPAV system 100 utilizes OFDM modulation technique due to its inherent adaptability in the presence of frequency selective channels, its resilience to narrow band interference, and its robustness to impulsive noise. Through the use of time-domain pulse shaping of the OFDM symbols, deep frequency notches can be achieved without the additional requirement of transmit notch filters. HPAV system 100 employs 1155 carriers, in the range from 1.80 MHz to 30.00 MHz.

Figure 2A:
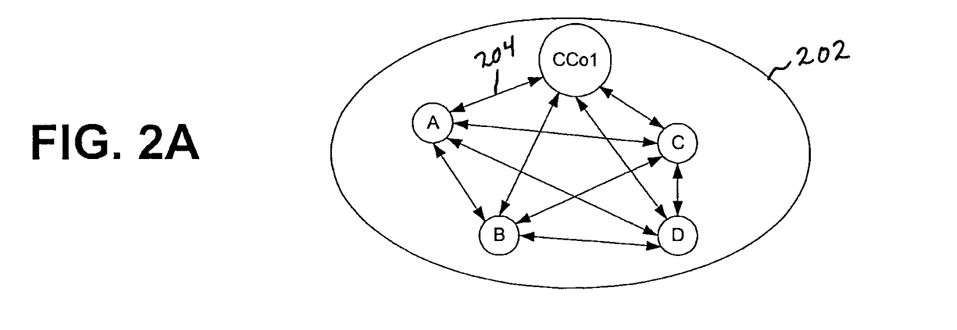
FIG. 2A illustrates a diagram of an exemplary powerline network configuration for the HPAV system in FIG. 1.

FIG. 2A illustrates an exemplary Audio Video Logical Network (AVLN) for HPAV system 100 in FIG. 1. An AVLN comprises a set of stations or devices that have the same Network Membership Key (NMK). In an AVLN, which is also generally referred to as a "powerline network" in the present application, one of the stations or devices becomes the Central Coordinator (CCo) device, which is responsible for coordinating the transmissions of all of the stations in the network, in order to achieve maximum overall network throughput as well as good QoS for each connection. The CCo is also responsible for authenticating stations that wish to join the network, managing encryption keys, and coordinating sharing of resources with neighbor networks. A CCo can either be preconfigured as such or be automatically selected through a specified selection procedure; however, only one station in an AVLN can function as a Central Coordinator (CCo) at one time. It is noted that the stations in an AVLN (i.e. a powerline network) can communicate via a powerline (i.e. an AC line).

As shown in FIG. 2A, AVLN 202 includes stations A, B, C, and D and CCo1. The Physical Network (PhyNet) of a given station is the set of stations that can physically communicate with the station—at least at the level of Frame Control (FC) and ROBO (robust) mode. A PhyNet is relative to a given station, and it is possible for PhyNets of physically closeby stations to be distinct. In the present application, it is noted that a double arrow line, such as double arrow line 204 in FIG. 2A, indicates an ability for two stations, such as station A and CCo1, to communicate on the PHY level. Also shown in FIG. 2A, all stations can communicate with each other and, consequently, the PhyNet of all stations is the same set {A, B, C, D, CCo1}, as shown in Table 1. Two stations belonging to an AVLN can communicate with each other if they belong to each other's PhyNet. Further shown in FIG. 2A, AVLN 202 coincides with the PhyNet of each station in AVLN 202.

TABLE 1

Figure 2B:
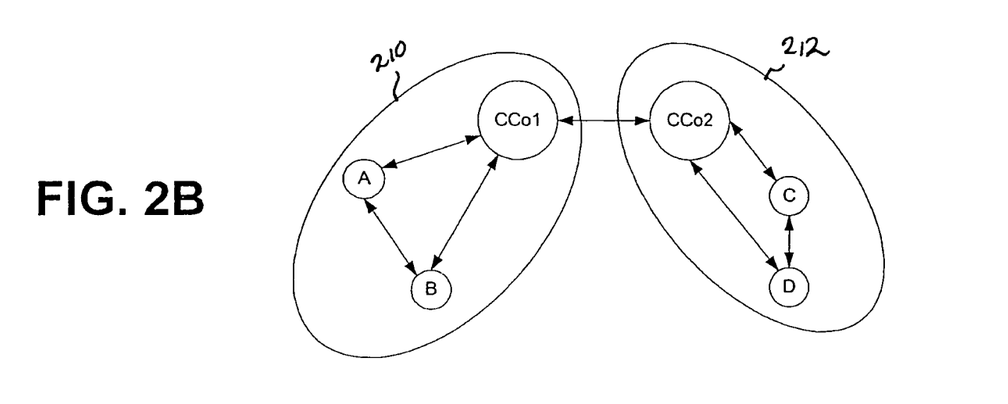
FIG. 2B illustrates a diagram of another exemplary powerline network configuration for the HPAV system in FIG. 1.
Figure 2C:
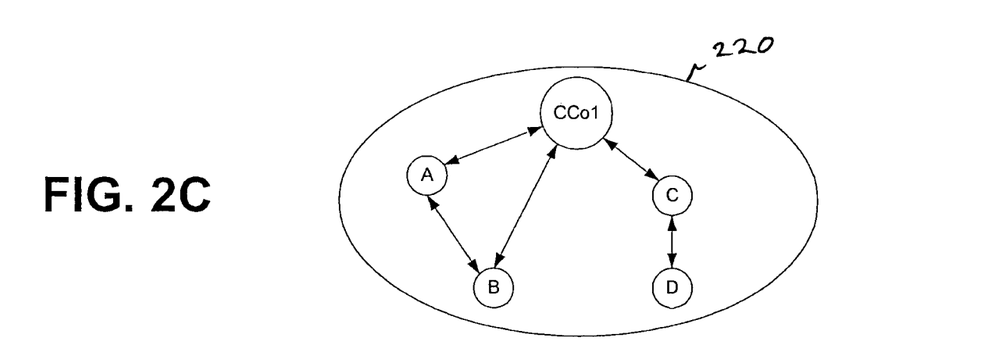
FIG. 2C illustrates a diagram of another exemplary powerline network configuration for the HPAV system in FIG. 1.

| | Physical Networks (PhyNets) in . . . | | |
|---|---|---|---|
| Station | FIG. 2A | FIG. 2B | FIG. 2C |
| A | {A, B, C, D, CCo1} | {A, B, CCo1} | {A, B, CCo1} |
| B | {A, B, C, D, CCo1} | {A, B, CCo1} | {A, B, CCo1} |
| C | {A, B, C, D, CCo1} | {C, D, CCo2} | {C, D, CCo1} |

TABLE 1-continued

| | Physical Networks (PhyNets) in . . . | | |
|---|---|---|---|
| Station | FIG. 2A | FIG. 2B | FIG. 2C |
| D | {A, B, C, D, CCo1} | {C, D, CCo2} | {C, D} |
| CCo1 | {A, B, C, D, CCo1} | {A, B, CCo1, CCo2} | {A, B, C, CCo1} |
| CCo2 | N/A | {C, D, CCo1, CCo2} | N/A |

FIG. 2B illustrates two exemplary AVLNs for HPAV system 100 in FIG. 1. As shown in FIG. 2B, AVLN 210 includes stations A and B and CCo1 and AVLN 212 includes CCo2 and stations C and D. The PhyNet for each station in FIG. 2B is shown in Table 1.

FIG. 2C illustrates an exemplary AVLN for HPAV system 100 in FIG. 1. As shown in FIG. 2C, AVLN 220 includes CCo1 and stations A, B, C, and D. The PhyNet for each station in FIG. 2C is shown in Table 1.

Figure 3:
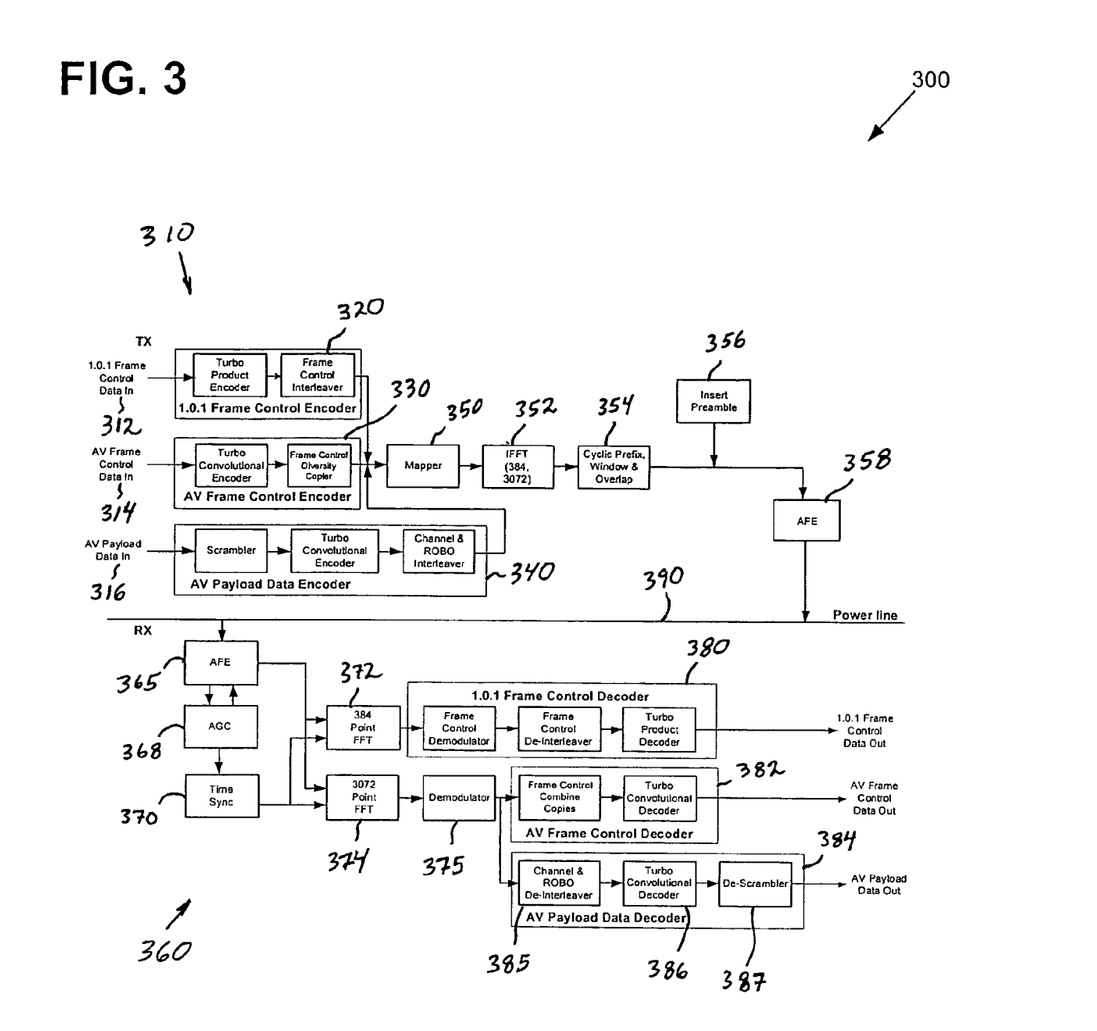
FIG. 3 illustrates a diagram of an exemplary HPAV transceiver for HPAV system 100 in FIG. 1.

FIG. 3 shows a diagram of an exemplary HPAV transceiver for HPAV system 100 in FIG. 1. HPAV transceiver 300 includes transmitter side 310, which uses OFDM modulation, and receiver side 360. On transmitter side 310, the PHY layer (e.g. PHY layer 110 in FIG. 1) receives its inputs from the MAC layer (e.g. MAC layer 120). Three separate processing chains are shown in FIG. 3 for different encoding for HomePlug 1.0.1 Frame Control (FC) data 312, HomePlug AV Frame Control data 314 and HomePlug AV Payload data 316, which are processed by 1.0.1 FC encoder 320, AV FC encoder 330 and AV payload data encoder 340, respectively. The outputs of the three encoders lead into a common OFDM modulation structure, including mapper 350, Inverse Fast Fourier Transform (IFFT) processor 352, cyclic prefix insertion, symbol window and overlap block 352, and preamble insertion 356, which eventually feeds Analog Front End (AFE) module 358 that couples the signal to power line medium 390.

At receiver side 360, AFE 365 operates with an Automatic Gain Controller (AGC) 368 and a time-synchronization module 370 to feed separate frame control and payload data recovery circuits. The frame control data is recovered by processing the received sample stream through 384-point FFT 372 for HomePlug 1.0.1 delimeters, and 3072-point FFT 374 for HomePlug AV, and through separate frame control decoders 380 and 382 for respective HomePlug 1.0.1 and HomePlug AV modes. The payload portion of the sampled time domain waveform, which contains only HomePlug AV formatted symbols, is processed through 3072-point FFT 374, demodulator 375, and through de-interleaver 385, turbo convolutional decoder 386, and de-scrambler 387 of AV payload data decoder 384 to recover the AV payload data.

In the present invention, the CCo of a network (e.g. CCo1 of AVLN 202 in FIG. 2A) transmits a special signal called the beacon, which contains system-wide information, such as the network ID, the number of neighboring networks with which it coordinates, the current schedule of transmissions (e.g. which station is allowed to transmit and when), and the mode of the network (e.g. if it is in HPAV or in HPAV Hybrid mode). The beacon can also contain responses to messages from specific stations that request resources, request to join the network, or are delivered an encryption key, etc. The beacon is sent by the CCo at regular intervals that are tied to a specific phase of the power cycle, as discussed below in relation to FIG. 4. The beacon is transmitted in a so-called ROBO (Robust) mode, which is used for reliable reception of the beacon by other stations, where each station experiences a different channel characteristic from the CCo to the station. In the ROBO mode, modulation is independent of the characteristics of the channel, and robustness is achieved through low rate coding, low density modulation, and repetition and interleaving of the payload.

Each HPAV station (e.g. stations A, B, C, and D in FIG. 2A) monitors the channel for the presence of HP1.0 devices. When a station detects the presence of HP1.0 devices, it notifies the CCo (e.g. CC01 in FIG. 2A), which in turn switches the network (e.g. AVLN 202 in FIG. 2A) to the HPAV Hybrid mode. In the Hybrid mode operation, HPAV networks avoid interference from HP1.0 stations by coaxing the HP1.0 stations to transmit only in the CSMA/CA region of the beacon period. Thus HPAV stations and HP1.0 stations can coexist on the same medium, while HPAV stations maintain all the advantages of scheduled transmissions in the contention-free portion of the period.

Figure 4:
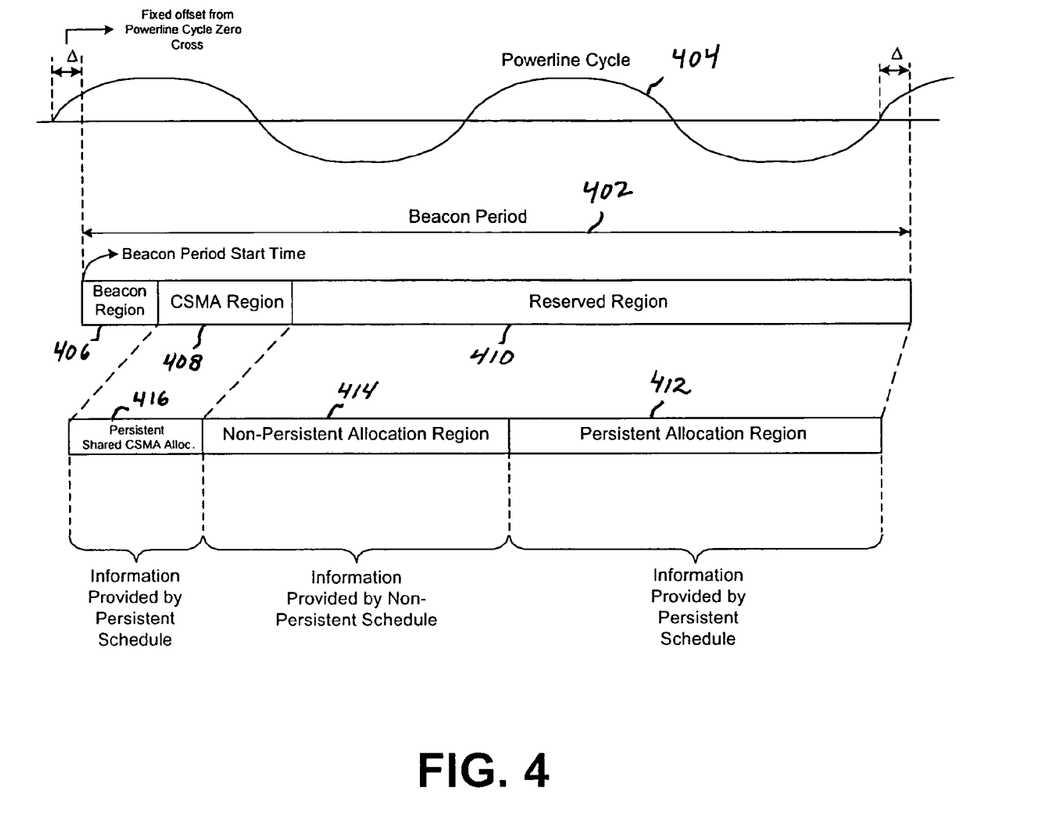
FIG. 4 illustrates a diagram of an exemplary beacon period, according to one embodiment of the present invention.

FIG. 4 illustrates an exemplary beacon period synchronized to an exemplary powerline cycle, according to one embodiment of the present invention. As shown in FIG. 4, beacon period 402 (i.e. the time between two consecutive beacon transmissions) is substantially equal to two periods of powerline cycle 404. For example, for a powerline frequency of 60 Hz (i.e. for a 60 Hz system), the beacon period is nominally equal to 33.33 milliseconds (ms). For example, for a powerline frequency of 50 Hz (i.e. for a 50 Hz system), beacon Period 402 is nominally equal to 40 ms. In one embodiment, beacon period 402 can be precisely equal to two periods of powerline cycle 404. As further shown in FIG. 4, the start of beacon period 402 can be offset from the start of a powerline cycle by a fixed duration.

As also shown in FIG. 4, beacon period 402 includes beacon region 406, CSMA (Carrier Sense Multiple Access) region 408, and reserved region 410. Beacon region 406 includes the beacon, which is generated by a CCo and can include a Preamble, a Frame Control, and a beacon payload. The CCo ensures that the beacon remains synchronized to the powerline cycle, independent of the CCo local clock frequency.

Information describing allocations within beacon period 402 is broadcast in the beacon payload by using one or more beacon entries. Beacon region 406 also includes information regarding the duration of CSMA region 408 and reserved region 410. CSMA region 408 includes persistent shared CSMA allocation region 416, which is allocated to connections (i.e. sessions between transmitting and receiving stations) that use CSMA channel-access mechanism. Reserved region 410, which is the section of beacon period 402 during which only one station has permission to transmit, is further divided into persistent allocation region 412 and non-persistent allocation region 414. Persistent allocation region 412 is allocated to connections (i.e. sessions between transmitting and receiving stations), where the connections require QoS (Quality of Service). Non-persistent allocation region 414 is allocated to one or more of the following:

(a) active connections that have allocation in persistent allocation region 412 but may need extra capacity, either because the channel has deteriorated for a brief or longer period of time, or because the requirements of a particular application have increased (e.g. during video or audio fast forward);

(b) an additional CSMA period (e.g. when the CCo senses high level of collisions in the regular CSMA period; and (c) special system needs, such as a discover beacon, whose purpose is to discover hidden nodes (i.e. stations) that cannot detect or hear the CCo.

The allocations in persistent allocation region 412 and the allocations in persistent shared CSMA allocation region 416 are controlled by a "Persistent Schedule," and the allocations in non-persistent allocation region 414 are controlled by a "Non-persistent Schedule." Both the Persistent Schedule and the Non-persistent Schedule are included in Broadcast messages in the beacon. The Persistent Schedule is valid for the current beacon period as well as for a number of subsequent beacon periods, where the number of subsequent beacon periods is indicated in the beacon. Since the Persistent Schedule remains valid for a number of subsequent beacon periods, it (i.e. the Persistent Schedule) allows all of the stations (e.g. stations A, B, C, and D in FIG. 2A) in the network (e.g. AVLN 202 in FIG. 2A) to know the schedule, even if they occasionally fail to receive the beacon.

In addition to the Persistent Schedule, the system (e.g. HPAV system 100 in FIG. 1) can support a Preview Schedule, which provides a preview of the next schedule. Thus, when a schedule change is necessary, the new schedule can be announced before it actually takes effect. The beacon can utilize a counter to indicate how many beacon periods will pass before the new schedule takes effect, for example. The Preview Schedule also allows some stations to miss beacon reception without losing schedule information.

In contrast to the Persistent Schedule, the Non-persistent Schedule is valid only for the beacon period in which it is announced. Consequently, if a station does not receive the beacon in a certain period, the station simply does not use any portion of non-persistent allocation region 414 during that period. On the other hand, when a station does receive the current beacon, it (i.e. the station) can take advantage of any allocation in non-persistent allocation region 414, either for its own use, or for the benefit of the system as a whole (e.g. in the form of the discover beacon).

The Persistent and Non-persistent Schedules advantageously allow a more reliable distribution of the schedule in an unreliable medium, while at the same time allowing a swift reaction to rapidly changing conditions, or implementation of system functions without specific allocation of resources to such functions.

Thus, as discussed above, the present invention provides an HPAV system including stations that communicate via a powerline in a powerline network, where one of the stations, which is designated as a CCo (Central Coordinator), generates a beacon that is synchronized to the powerline and includes Persistent and Non-persistent Schedules. As a result, the present invention achieves an HPAV system that advantageously provides flexible scheduling of resources in a powerline network environment.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, it is contemplated that the circuitry disclosed herein can be implemented in software and/or hardware, and the software may be stored in any storage medium or memory. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for coordinating transmissions on a centrally coordinated powerline network, said method comprising: transmitting beacons by a central coordinator to a plurality of stations to define beacon periods beginning at pre-defined phases of a powerline cycle, wherein said beacons contain at least transmission schedules for at least said beacon periods; wherein said transmission schedules contain allocations fixed in phase relative to the powerline cycle; wherein said beacon transmissions include a persistent schedule valid for a current beacon period and a number of subsequent beacon periods defining the schedule of transmissions said plurality of stations follow at least when one or more beacons of said subsequent beacon periods are not received by at least one of said plurality of stations.

2. The method of claim 1, wherein said beacon includes a network identification, a network mode, a number of neighbor networks and a current schedule.

3. The method of claim 1, wherein said beacon period is substantially equal to two periods of said cycle of said powerline.

4. The method of claim 1 and wherein said transmitting comprises transmitting said beacons at said pre-defined phases.

5. A device for coordinating transmissions by a plurality of network devices in a centrally coordinated powerline network, said device comprising: a configuring unit to configure said device to be a central coordinator capable of generating beacons, wherein said beacons define beacon periods beginning at pre-defined phases of a powerline cycle and contain at least transmission schedules for at least said beacon periods; and a beacon transmitter to transmit said beacons to said plurality of network devices; wherein said transmission schedules contain allocations fixed in phase relative to the powerline cycle; wherein said beacon transmissions include a persistent schedule valid for a current beacon period and a number of subsequent beacon periods defining the schedule of transmissions said plurality of stations follow at least when one or more beacons of said subsequent beacon periods are not received by at least one of said plurality of stations.

6. The device of claim 5, wherein said beacon includes a network identification, a network mode, a number of neighbor networks and a current schedule.

7. The device of claim 5 and wherein said transmitter transmits said beacons at said pre-defined phases.

* * * * *

UNITED STATES PATENT AND TRADEMARK OFFICE
CERTIFICATE OF CORRECTION

| | | |
|---|---|---|
| PATENT NO. | : 8,553,706 B2 | Page 1 of 1 |
| APPLICATION NO. | : 11/492506 | |
| DATED | : October 8, 2013 | |
| INVENTOR(S) | : Neal Riedel et al. | |

It is certified that error appears in the above-identified patent and that said Letters Patent is hereby corrected as shown below:

Title Page: Item 73

In the Assignment data printed on the patent, the name "CopperGate Communications Ltd., Tel Aviv (IL)" should be replaced with -- SIGMA DESIGNS ISRAEL S.D.I. LTD., Tel Aviv (IL)

ATHEROS COMMUNICATIONS, INC., Santa Clara, CA (US)

SHARP CORPORATION, Tenri Nara (JP) --

Signed and Sealed this
Twenty-eighth Day of January, 2014

Michelle K. Lee
*Deputy Director of the United States Patent and Trademark Office*